United States Patent [19]

Röhm

[11] Patent Number: 4,913,449
[45] Date of Patent: Apr. 3, 1990

[54] DRILL CHUCK WITH BRAKE RING

[76] Inventor: Günter Horst Röhm, Heinrich-Röhm-Str. 50, D-7927 Sontheim, Fed. Rep. of Germany

[21] Appl. No.: 285,715

[22] Filed: Dec. 16, 1988

[30] Foreign Application Priority Data

Jan. 14, 1988 [DE] Fed. Rep. of Germany ... 880032[U]

[51] Int. Cl.$^4$ .............................................. B23B 31/06
[52] U.S. Cl. .......................................... 279/60; 279/63
[58] Field of Search .................. 408/241 R; 279/1 K, 279/56, 60, 61, 62, 63; 81/3.4, 16

[56] References Cited

U.S. PATENT DOCUMENTS

| | | | |
|---|---|---|---|
| 2,338,753 | 1/1944 | Flessner | 81/3.4 |
| 3,325,166 | 6/1967 | McCarthy et al. | 279/63 |
| 4,323,324 | 4/1982 | Eberhardt | 408/124 |
| 4,460,296 | 7/1984 | Sivertson, Jr. | 279/62 |
| 4,526,497 | 7/1985 | Hatfield | 279/1 K |
| 4,695,065 | 9/1987 | Komatsu et al. | 279/1 K |
| 4,817,971 | 4/1989 | Flynn | 279/1 K |
| 4,836,563 | 6/1989 | Rohm | 279/19.3 |

FOREIGN PATENT DOCUMENTS 1800418 5/1970 Fed. Rep. of Germany ......... 81/3.4

Primary Examiner—Daniel Howell
Attorney, Agent, or Firm—Herbert Dubno; Andrew Wilford

[57] ABSTRACT

A chuck comprises a body centered on an axis and adapted to be mounted on a drill spindle for rotation about the axis and a tightening sleeve carried on the body and rotatable thereon about the axis. The sleeve or body is formed centered on the axis with an array of angularly equispaced guides inclined to the axis and the other element is formed centered on the axis with a screwthread formation. Respective jaws are displaceable axially and radially of the axis in the guides relative to the axis and are formed with teeth meshing with the screwthread so that rotation of the sleeve relative to the body in one rotational sense moves the jaws axially forward and radially together and opposite rotation moves them axially backward and radially apart. A braking sleeve rotatable on the tightening sleeve has an inner surface engageable with the tightening sleeve and this inner surface can be pressed radially into engagement with the tightening sleeve.

11 Claims, 5 Drawing Sheets

DRILL CHUCK WITH BRAKE RING

FIELD OF THE INVENTION

The present invention relates to a drill chuck. More particularly this invention concerns such a chuck having a hand-actuated tightening sleeve.

BACKGROUND OF THE INVENTION

A standard drill chuck has a chuck body that is mounted at the front end of a drill spindle and rotated about its center axis. This body carries a tightening sleeve formed with a plurality of inclined guides carrying respective jaws having teeth meshing with a screwthread of the chuck body. It is also known to provide the guides on the chuck body and the screwthread on the sleeve for the same effect. The edge of the tightening sleeve may also be provided with teeth that can mesh with teeth on a chuck key fitted to a pilot hole in the chuck body to bring extra force to bear. Rotation of the sleeve in one direction moves the jaws axially forward and radially toward one another and rotation in the opposite direction moves them axially backward and radially apart. Thus it is possible by rotation of this sleeve to clamp a tool (or workpiece) in the jaws and by opposite rotation to release this tool (or workpiece).

To chuck or dechuck a tool it is standard for the user to grasp the tightening sleeve and then actuate the drill's trigger, with the rotation-direction switch set appropriately according to whether the chuck is to be tightened or loosened. If the chuck is also of the key type the key is inserted to break the chuck free at the start of a dechucking operation or to give the final tightening at the end of a chucking operation.

It takes a fairly skilled person who is quite familiar with the drill in question to safely and skillfully perform such a tightening or loosening operation by hand with a motor assist. The potential for injury is not small, and the difficulty of accurately bringing just the right amount of torque to bear by hand is considerable.

OBJECTS OF THE INVENTION

It is therefore an object of the present invention to provide an improved drill chuck.

Another object is the provision of such an improved drill chuck which overcomes the above-given disadvantages, that is which can be loosened or tightened by hand with a motor assist with little danger and relatively easily.

SUMMARY OF THE INVENTION

A chuck comprises a body element centered on an axis and adapted to be mounted on a drill spindle for rotation about the axis and a tightening sleeve element carried on the body element and rotatable thereon about the axis. One of the elements is formed centered on the axis with an array of angularly equispaced guides inclined to the axis and the other element is formed centered on the axis with a screwthread formation. Respective jaws are displaceable axially and radially of the axis in the guides relative to the axis and are formed with teeth meshing with the screwthread so that rotation of the sleeve element relative to the body element in one rotational sense moves the jaws axially forward and radially together and opposite rotation moves them axially backward and radially apart. According to this invention a braking sleeve rotatable on the tightening sleeve element has an inner surface engageable with the tightening sleeve and this inner surface can be pressed radially into engagement with the tightening sleeve element.

Thus with this system the user merely grasps the braking sleeve, even while the chuck is rotating relatively rapidly. The braking sleeve normally rotates freely on the chuck so that it can be grasped and brought to a rotational halt easily, with no danger to the person grasping it. Then the user either squeezes or axially shifts this sleeve to bring its inner surface to bear on the tightening sleeve, thereby slowing same. The actual friction that accounts for the torque transmission takes place between the surfaces of the braking and tightening sleeves, not between the tightening sleeve and the user's hand, so that it is possible for the user to control this force very accurately and even bring considerable friction into effect with no possibility of hurting his or her hand.

According to this invention the formation permitting the inner sleeve surface to be pressed radially against the sleeve element is at least one axially open and radially through-going slot formed in the braking sleeve. Normally the braking sleeve is formed with a plurality of such slots some of which open axially forward and some of which open axially backward. In this arrangement, with a radially compressible locking sleeve, formations are provided on the braking and tightening sleeves preventing substantial relative axial displacement. These formations can be a radially outwardly open groove formed on the sleeve element and a radially inwardly projecting lip on the sleeve received in the groove, a shoulder formed in the sleeve element and confronting the sleeve in one axial direction and a ring set in the sleeve and confronting the sleeve in the opposite axial direction, a radially outwardly groove formed in the tightening sleeve and receiving the braking sleeve.

In another arrangement according to this invention the inner surface of the braking sleeve is frustoconical and is pressed against the tightening sleeve by axial displacement of the braking sleeve. In this arrangement a spring, typically a washer spring is provided for urging the inner surface out of engagement with the sleeve element In addition the tightening sleeve element has a frustoconical forward surface centered on the axis and engaged with the inner surface of the braking sleeve.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 2:
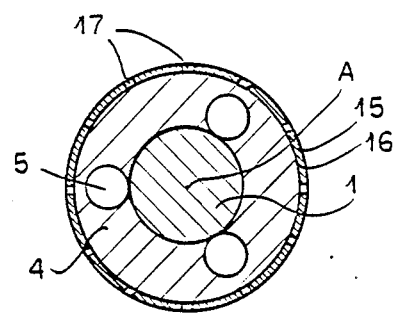
FIGS. 2, 4, 6, and 8 are cross sections taken along lines II—II, IV—IV, VI—VI, and VIII—VIII of FIGS. 1, 3, 5, and 7, respectively.
Figure 1:
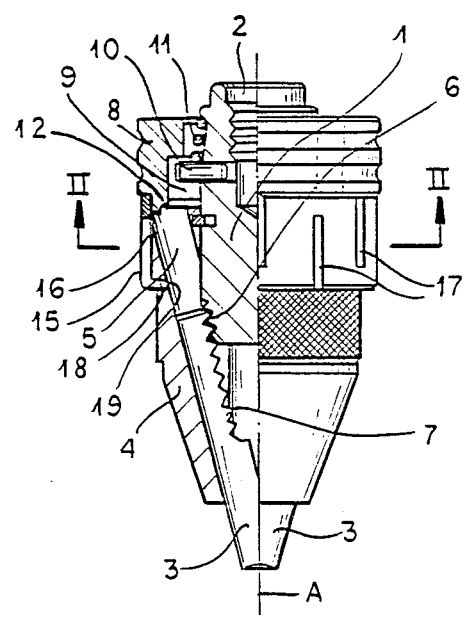
FIGS. 1, 3, 5, and 7 are axial sections through first, second, third, and fourth embodiments of the inventions.

As seen in FIGS. 1 through 6 of the drawing, the chuck according to this invention has a machined steel body 1 centered on a spindle axis A and formed with an axially rearwardly open and threaded spindle bore 2 into which the drill spindle is normally fitted. This body 1 carries centered on the axis A a tightening sleeve 4 formed with three angled guides 5 in which respective jaws 3 can slide. A screwthread 6 on the body 1 meshes with screwthreads 7 on the jaws 3. A locking ring 8 is carried on the rear part of the chuck body 1 and has a radially inwardly open recess 9 in which a pin 10 projecting radially from the body 1 engages so that the two parts 1 and 8 are axially relatively displaceable but rotationally coupled. Axially rearwardly directed teeth 12 on the sleeve 4 engage complementary axially forwardly directed teeth on the ring 8 and a spring 11 urges the ring axially forward. Thus normally the teeth 12 are engaged and the sleeve 4 cannot rotate on the body 1 so that the chuck cannot loosen in use.

Figure 8:
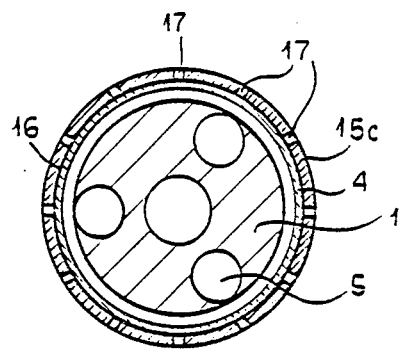
Figure 7:
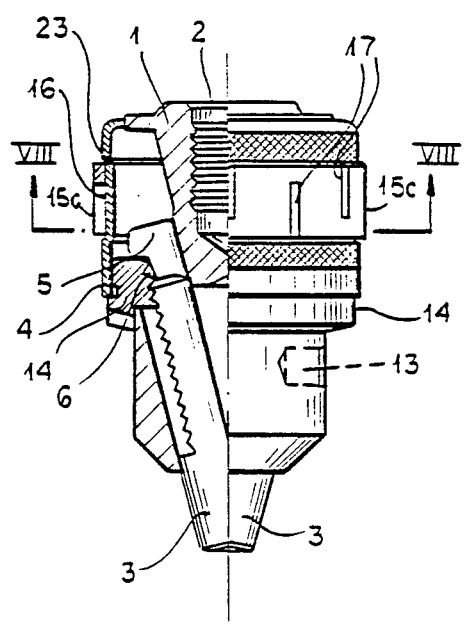

In the arrangement of FIGS. 7 and 8 the guides 5 are formed in the chuck body 1 and the teeth 7 of the jaws are turned radially outward and mesh with a screwthread 6 on the sleeve 4. In addition this sleeve 4 is provided with a toothed end ring 14 so that a standard chuck key can be inserted in a pilot hole 13 and used to bring extra torque to bear for tightening or loosening. This arrangement does not have a locking ring 8 because the use of a key to tighten the chuck allows it to be tightened enough that slipping is not a problem.

In standard fashion when the sleeve 4 is rotated in one direction the jaws 3 move axially forward and radially inward, and when oppositely rotated they move axially backward and radially outward for chuck and dechucking, respectively, a tool or workpiece held centered on the axis A. The sleeve 4 can only be rotated, however, when the ring 8 is pulled back slightly, something that is fairly easy to do while grasping and holding this sleeve 4.

Figure 9:
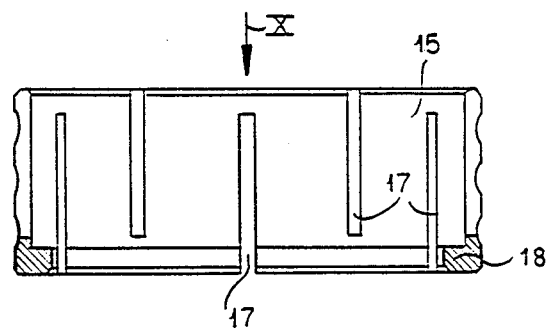
FIG. 9 is a large-scale axial section through the braking ring of the first embodiment.
Figure 10:
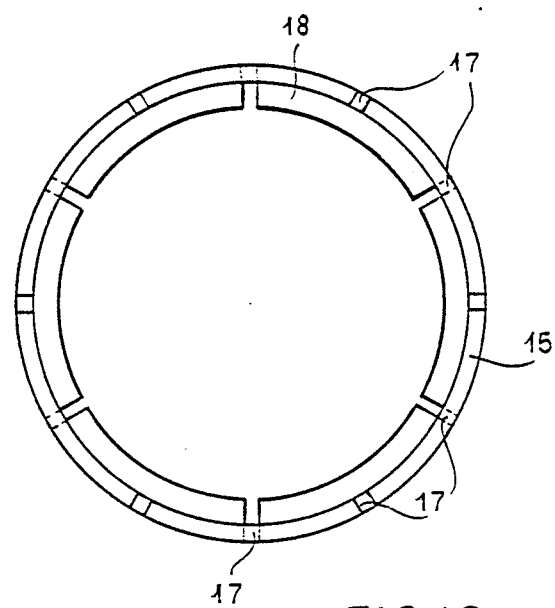
FIG. 10 is an axial end view taken in the direction of arrow X of FIG. 9.

According to this invention and as shown in detail in FIGS. 9 and 10 a braking sleeve 15 is carried on the sleeve 4 and has an inner surface 16 radially confronting and engageable with the outer surface of this sleeve 4. This braking sleeve 15 is made radially compressible by forming it with radially but not axially throughgoing and axially open slots 17 that are angularly equispaced about the sleeve 15, with alternate slots 17 opening axially oppositely. The sleeve 4 is formed with a groove 19 into which an inwardly projecting lip 18 at the front end of the sleeve 15 can engage to prevent this sleeve 15 from moving axially on the chuck.

With this arrangement, therefore, the user need merely grasp the sleeve 15 which can rotate freely on the sleeve 4. This can even be done while the chuck is turning relatively rapidly. To loosen or tighten the chuck the user need merely radially compress this sleeve 15 somewhat, while of course simultaneously pulling back the lock ring 8, so that the inner surface 16 frictionally engages the sleeve 4 and applies torque to it. Since the slip is all between the metal surfaces of the sleeves 4 and 15, there is virtually no possibility of the user hurting his or her hand, and it is possible to dose the frictional force very accurately, that is bring very little or very much force to bear, merely depending on how tightly the sleeve 15 is radially compressed.

Figure 4:
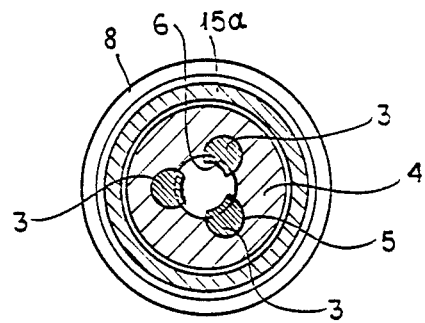
Figure 3:
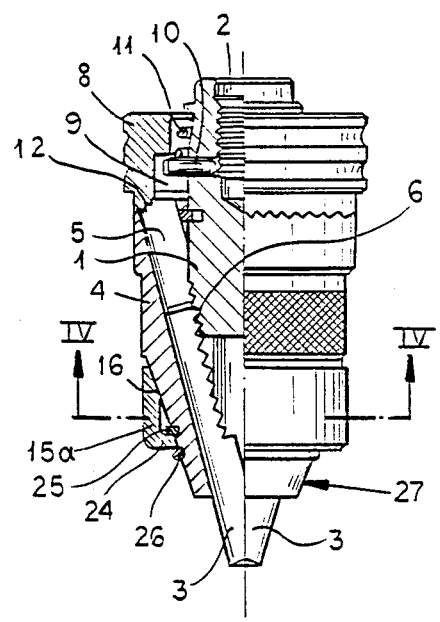

In the system of FIGS. 3 and 4 the sleeve 15a, which functions identically to that of FIGS. 1, 2, 9, and 10, has an inwardly bent lip 24 at its front end that is engaged axially between a pair of rings 25 and 26 fitted in axially spaced and radially outwardly open grooves formed in the sleeve 4. Thus in this arrangement the surface 15 is frustoconical as opposed to cylindrical, which it is in all other embodiments. In addition in this arrangement the surface 16 is brought to bear on the frustoconical outer surface of the front end portion of the sleeve 4 by pulling the sleeve 15 axially backward, not by radially compressing it. The ring 25 is a spring ring which urges the sleeve 15a axially forward to keep its surface 16 normally out of contact with the sleeve 4.

Figure 6:
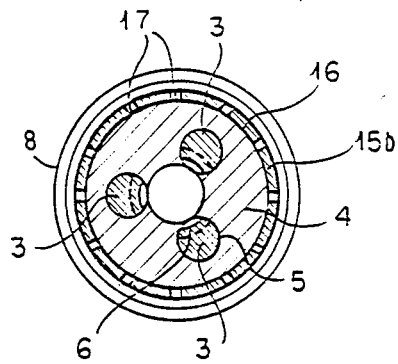
Figure 5:
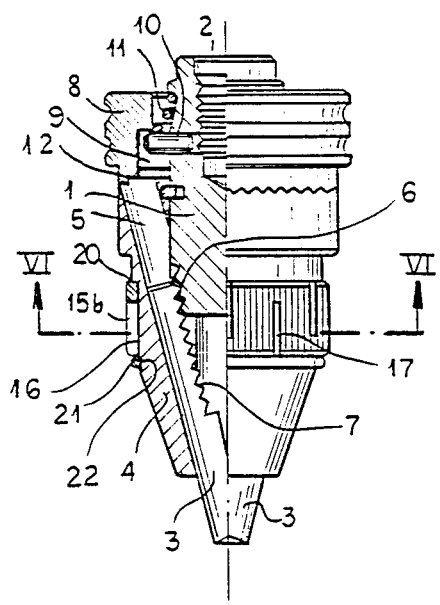

FIGS. 5 and 6 show a sleeve 15b which is retained axially between a shoulder 20 formed on the sleeve 4 and a snap ring 21 held in a groove 22 formed in this sleeve 4.

The system of FIGS. 7 and 8 retains the sleeve 15c by forming a radially outwardly open groove or recess 23 in the tightening sleeve 4, which is here made of sheet metal. The braking sleeve 15c can be expanded radially enough to fit it over the sleeve 4, but then is retained solidly enough that it does not move off the sleeve 4.

I claim:

1. A chuck comprising:
   a body element centered on an axis and adapted to be mounted on a drill spindle for rotation about the axis;
   a tightening sleeve element carried on the body element and rotatable thereon about the axis, one of the elements being formed centered on the axis with an array of angularly equispaced guides inclined to the axis and the other element being formed centered on the axis with a screwthread formation;
   respective jaws displaceable axially and radially of the axis in the guides relative to the axis and formed with teeth meshing with the screwthread, whereby rotation of the sleeve element relative to the body element in one rotational sense moves the jaws axially forward and radially together and opposite rotation moves them axially backward and radially apart;
   a braking sleeve mounted rotatably on the tightening sleeve element and having an inner surface engageable with the tightening sleeve element, said braking sleeve being formed circumferentially in one piece; and
   means for pressing the inner surface into engagement with the tightening sleeve element, said means being at least one axially open and radially throughgoing slot formed in the braking sleeve.

2. The improved chuck defined in claim 1 wherein the braking sleeve is formed with a plurality of said slots some of which open axially forward and some of which open axially backward.

3. A chuck comprising:
   a body element centered on an axis and adapted to be mounted on a drill spindle for rotation about the axis;
   a tightening sleeve element carried on the body element and rotatable thereon about the axis, one of the elements being formed centered on the axis with an array of angularly equispaced guides inclined to the axis and the other element being formed centered on the axis with a screwthread formation;
   respective jaws displaceable axially and radially of the axis in the guides relative to the axis and formed with teeth meshing with the screwthread, whereby rotation of the sleeve element relative to the body element in one rotational sense moves the jaws axially forward and radially together and opposite rotation moves them axially backward and radially apart;

a braking sleeve mounted rotatably on the tightening sleeve element and having an inner surface engageable with the tightening sleeve element, said braking sleeve being formed circumferentially in one piece;

means for pressing the inner surface into engagement with the tightening sleeve element; and means on the braking sleeve and means on the tightening sleeve element preventing substantial relative axial displacement.

4. The improved chuck defined in claim 3 wherein the means preventing relative axial displacement between the braking sleeve and tightening sleeve element includes a radially outwardly open groove formed on the tightening sleeve element and a radially inwardly projecting lip on the braking sleeve received in the groove.

5. The improved chuck defined in claim 3 wherein the means preventing relative axial displacement between the braking sleeve and tightening sleeve element includes a shoulder formed in the tightening sleeve element and confronting the braking sleeve in one axial direction and a ring set in the tightening sleeve element, the ring confronting the braking sleeve in the opposite axial direction.

6. The improved chuck defined in claim 3 wherein the means preventing relative axial displacement between the braking sleeve and tightening sleeve element includes a radially outwardly open groove formed in the tightening sleeve element, the groove receiving at least a part of the braking sleeve.

7. The improved chuck defined in claim 3 wherein the inner surface is frustoconical and is pressed against the sleeve element by axial displacement of the sleeve.

8. The improved chuck defined in claim 7, further comprising spring means urging the inner surface out of engagement with the tightening sleeve element.

9. The improved chuck defined in claim 8 wherein the spring means is a spring washer set in the tightening sleeve element.

10. The improved chuck defined in claim 9 wherein the tightening sleeve element has a frustoconical forward surface centered on the axis and engaged with the inner surface of the braking sleeve.

11. A chuck comprising:

a body element centered on an axis and adapted to be mounted on a drill spindle for rotation about the axis, a tightening sleeve element carried on the body element and rotatable thereon about the axis, one of the elements being formed centered on the axis with an array of angularly equispaced guides inclined to the axis and the other element being formed centered on the axis with a screwthread formation;

respective jaws displaceable axially and radially of the axis in the guides relative to the axis and formed with teeth meshing with the screwthread, whereby rotation of the sleeve element relative to the body element in one rotational sense moves the jaws axially forward and radially together and opposite rotation moves them axially backward and radially apart;

a braking sleeve mounted rotatably on the tightening sleeve element and having an inner surface engageable with the tightening sleeve element and an exposed outer surface adapted to be grasped;

formations on the braking sleeve and tightening sleeve element preventing substantial relative axial displacement; and means including formations in the braking sleeve permitting the braking sleeve to be compressed radially for pressing the inner surface radially into engagement with the tightening sleeve element.

* * * * *